United States Patent
Mori

(10) Patent No.: US 11,097,602 B2
(45) Date of Patent: Aug. 24, 2021

(54) DOOR SERVICE HOLE COVER

(71) Applicant: Toyota Jidosha Kabushiki Kaisha, Toyota (JP)

(72) Inventor: Hiroyuki Mori, Ichinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/676,005

(22) Filed: Nov. 6, 2019

(65) Prior Publication Data
US 2020/0148041 A1 May 14, 2020

(30) Foreign Application Priority Data
Nov. 14, 2018 (JP) .............................. JP2018-213682

(51) Int. Cl.
| | |
|---|---|
| *B60J 5/04* | (2006.01) |
| *B60R 21/04* | (2006.01) |
| *B60R 21/00* | (2006.01) |

(52) U.S. Cl.
CPC ............. *B60J 5/0416* (2013.01); *B60J 5/045* (2013.01); *B60R 21/0428* (2013.01); *B60R 2021/006* (2013.01)

(58) Field of Classification Search
CPC ..... B60J 5/042; B60J 5/0461; B60R 13/0243; B60R 2021/0006; B60R 21/0428; B60R 21/04
USPC ........................................ 296/146.5, 146.6
See application file for complete search history.

(56) References Cited

U.S. PATENT DOCUMENTS

| | | | | |
|---|---|---|---|---|
| 5,934,730 A | * | 8/1999 | Yagishita ............... | B60J 5/0451 280/751 |
| 8,215,699 B2 | * | 7/2012 | Suzuki .................. | B60J 5/0451 296/146.7 |
| 10,358,105 B2 | * | 7/2019 | Suzuki .................. | B60J 5/0461 |
| 2001/0017476 A1 | | 8/2001 | Nishikawa et al. | |
| 2010/0200346 A1 | * | 8/2010 | Shimokawa ........... | F16F 7/124 188/377 |
| 2013/0076060 A1 | * | 3/2013 | Nakashima ............ | B60R 21/04 296/146.7 |
| 2015/0291117 A1 | * | 10/2015 | Guiard ................ | B29C 45/0025 296/187.05 |

(Continued)

FOREIGN PATENT DOCUMENTS

| | | | | |
|---|---|---|---|---|
| JP | 2001-239834 A | | 9/2001 | |
| JP | 2017-039448 A | | 2/2017 | |
| JP | WO2017/033511 | * | 3/2017 | ............... B60J 5/00 |

*Primary Examiner* — Jason S Morrow
*Assistant Examiner* — Kevin P Weldon
(74) *Attorney, Agent, or Firm* — Dinsmore & Shohl LLP

(57) ABSTRACT

A door service hole cover includes a cover component that is configured to cover a service hole, and a shock absorption component that is integral to the cover component. The shock absorption component includes a cabin inner component, at least a portion of which projects from the cover component toward the inside of the cabin and which is hollow and open toward the outside of the cabin; and a fragile portion formed on a side surface of the cabin inner component and configured to allow the cabin inner component to crush and deform upon application of a force acting in the direction of projection of the cabin inner component. Upon application of a force acting in the direction of projection, the cabin inner component crushes inwardly and deforms while being twisted.

5 Claims, 4 Drawing Sheets

(56) References Cited

U.S. PATENT DOCUMENTS

2018/0111453 A1* 4/2018 Patel .................. B62D 25/2036
2018/0244232 A1 8/2018 Suzuki

* cited by examiner

DOOR SERVICE HOLE COVER

CROSS REFERENCE TO RELATED APPLICATION

This application claims priority to Japanese Patent Application No. 2018-213682 filed on Nov. 14, 2018, which is incorporated herein by reference in its entirety including the specification, claims, drawings, and abstract.

TECHNICAL FIELD

The present disclosure relates to a door service hole cover that is configured to cover a service hole formed in a door for a vehicle and, in particular, to a door service hole cover including a shock absorption component.

BACKGROUND

Shock absorption components for vehicle door are known as disclosed in, for example, JP 2017-39448 A.

JP 2017-39448 A discloses a shock absorption component that is inserted in a service hole formed in a vehicle door. The shock absorption component crushes upon a side collision of a vehicle to absorb the impact caused by the side collision. In order to increase the thickness of the shock absorption component as measured in the direction from the inside to the outside of the cabin to achieve a higher shock absorption performance, an outer end of the shock absorption component that is closer to the outside of the cabin is placed closer to the outside of the cabin than the service hole.

Typically, an internal space of a vehicle door has a pressure sensor for detecting a change in pressure in the internal space, and a side collision is detected by detecting the change in pressure.

In the structure disclosed in JP 2017-39448 A, even if the shock absorption component crushes upon a side collision, the crush does not always contribute to a change in volume of the internal space of the vehicle door, and the pressure sensor does not easily detect a change in pressure. Therefore, the structure disclosed in JP 2017-39448 A does not always easily detect a side collision.

The present disclosure is directed to facilitating detection of a side collision of a vehicle using a door service hole cover that includes a shock absorption component and that covers a service hole formed in a vehicle door.

SUMMARY

According to one aspect of the present disclosure, there is provided a door service hole cover including a cover component that is configured to cover a service hole formed in a door for a vehicle; and a shock absorption component that is integral to the cover component. The shock absorption component includes a cabin inner component, at least a portion of which projects from the cover component toward the inside of the cabin and which is hollow and open toward the outside of the vehicle; and a fragile portion formed on a side surface of the cabin inner component and configured to allow the cabin inner component to crush and deform upon application of a force acting in the direction of projection of the cabin inner component.

With the above-described structure, upon a side collision of a vehicle, as the cabin inner component crushes and deforms, air in the cabin inner component is compressed, and, in turn, the pressure in the vehicle door can be increased through an opening of the cabin inner component. This facilitates detection of a change in pressure in the vehicle door and therefore, in turn, facilitates detection of a side collision of the vehicle.

In an embodiment, the cabin inner component includes a wall. The wall has a slope surface that is oblique to the direction of projection, and a side surface that is opposite the slope surface and in parallel with the direction of projection. Upon application of a force acting in the direction of projection, while the slope surface serves as a brace and retards deformation of the wall, the wall inwardly crushes and deforms as the wall collapses sideways toward the side surface. With this structure, the cabin inner component can be deformed without interfering with components disposed near the cabin inner component, and therefore it is unnecessary to provide additional space around the cabin inner component to allow for deformation of the cabin inner component.

A door service hole cover according to an embodiment of the present disclosure facilitates detection of a side collision of a vehicle.

BRIEF DESCRIPTION OF DRAWINGS

Embodiments of the present disclosure will be described based on the following figures, wherein.

DESCRIPTION OF EMBODIMENTS

Figure 1:
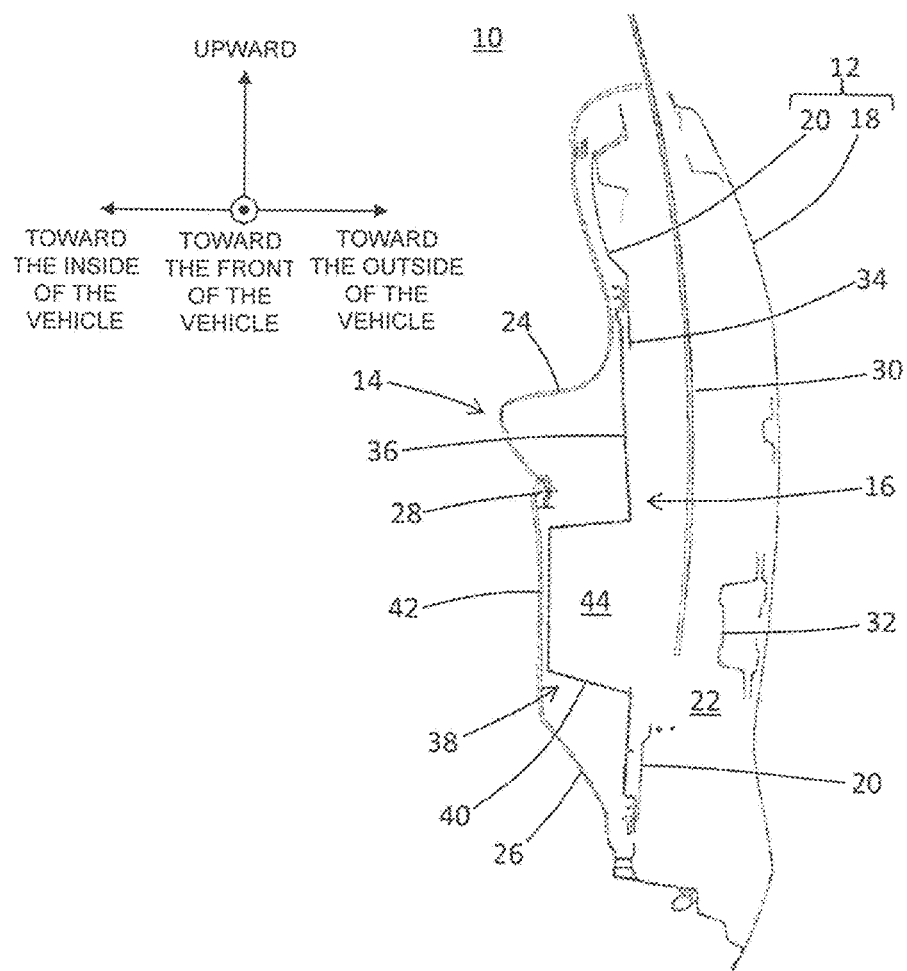
FIG. 1 is a cross-sectional view of a door for a vehicle according to an embodiment of the present disclosure.

A door for a vehicle according to an embodiment of the present disclosure will be described below with reference to FIG. FIG. 1 is a cross-sectional view of a vehicle door 10 according to an embodiment of the present disclosure.

The vehicle door 10 is, for example, a side door that is placed on a side of a vehicle. The vehicle door 10 principally includes a door panel 12, a door trim 14 that covers the door panel 12 from the inside of the cabin, and a door service hole cover 16 that is placed between the door panel 12 and the door trim 14.

The door panel 12 includes a door outer panel 18 and a door inner panel 20. The door panel 12 has therein a space 22 that is enclosed by the door outer panel 18 and the door inner panel 20.

The door trim 14 is attached to the door inner panel 20 from the inside of the cabin. The door trim 14 includes, for example, an ornament 24 and a lower board 26. For example, the ornament 24 and the lower board 26 are connected to each other with a joint 28.

Functional components, such as a raising and lowering mechanism (including a window regulator and an electrical motor) for moving a window glass 30 up and down, an impact beam 32, a lock mechanism for locking the vehicle door 10, and a pressure sensor, are placed between the door outer panel 18 and the door inner panel 20. The pressure sensor detects a change in pressure in the space 22 in the vehicle door 10. A side collision of the vehicle is detected based on the detected change in pressure. When the pressure in the space 22 in the vehicle door 10 sharply increases upon, for example, a side collision, an on-vehicle controller activates an on-vehicle airbag (such as a side airbag).

The door inner panel 20 has a service hole 34 for allowing, for example, installation and maintenance of the above-described functional components.

The door service hole cover 16 for covering the service hole 34 is attached to the door inner panel 20. The door service hole cover 16 is, for example, a resin component and includes a flat cover component 36 and a shock absorption component 38. For example, the cover component 36 and the shock absorption component 38 are integral to each other. The shock absorption component 38 includes a cabin inner component 40, at least a portion of which projects from the cover component 36 toward the inside of the cabin and which is open toward the outside of the vehicle. In other words, the cabin inner component 40 projects from the cover component 36 toward the door trim 14 and is open toward the door outer panel 18. Further, a portion of the cabin inner component 40 that faces the door trim 14 is closed, and that portion constitutes a flat surface 42. The cabin inner component 40 is a hollow cylindrical member having a space 44 therein. The cabin inner component 40 constitutes a bag structure that is open toward the outside of the vehicle. As the cabin inner component 40 is open toward the outside of the vehicle, the space 44 in the cabin inner component 40 is in communication with the space 22 in the vehicle door 10.

A portion of the cabin inner component 40 may project toward the outside of the cabin. Still, it should be noted that the cabin inner component 40 does not have to project toward the outside of the cabin; that is, the entire cabin inner component 40 may project toward the inside of the cabin as illustrated in FIG. 1.

Figure 2:
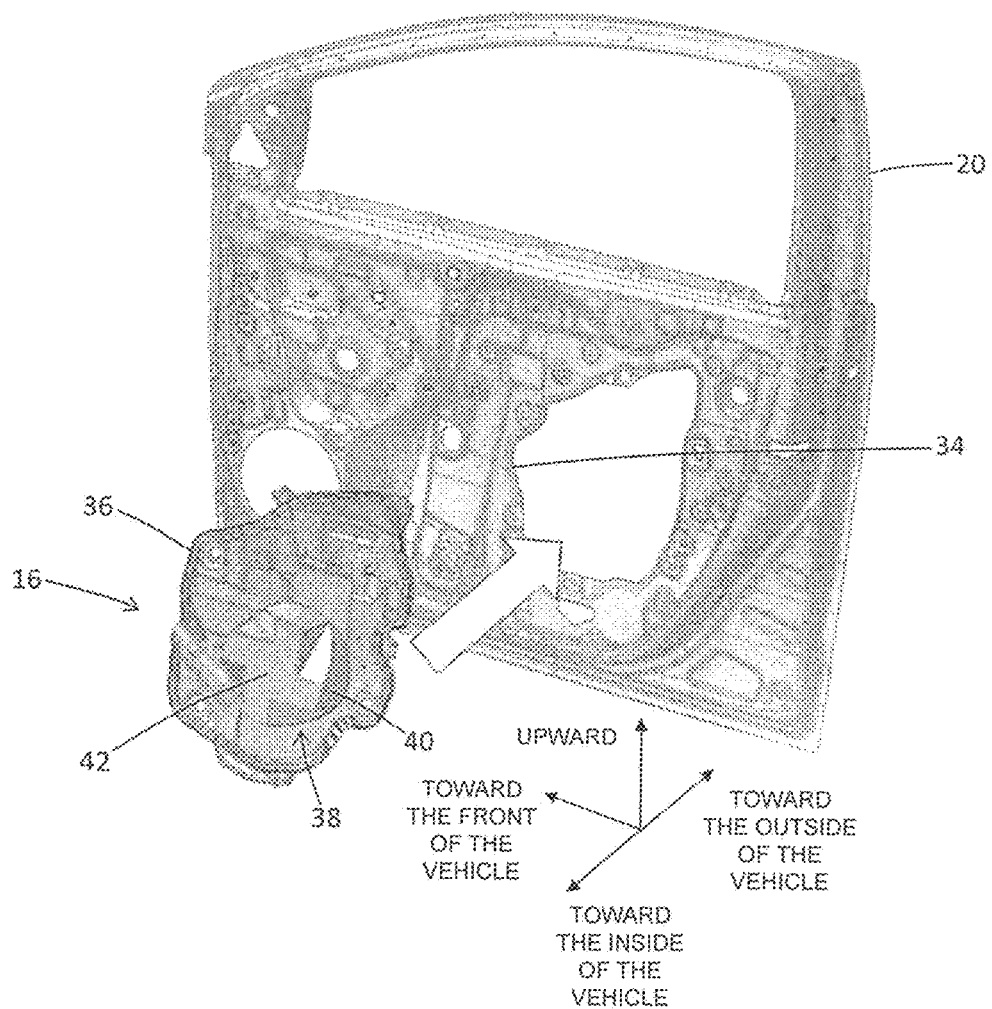
FIG. 2 is an exploded perspective view of a door inner panel and a door service hole cover according to an embodiment of the present disclosure.

The door service hole cover 16 will be described in detail below with reference to FIG. 2. FIG. 2 is an exploded perspective view of the door inner panel 20 and the door service hole cover 16 according to an embodiment of the present disclosure.

The cover component 36 is sized to cover the service hole 34 from the inside of the cabin. An outer end of the cover component 36 has a plurality of attachment holes. Further, the door inner panel 20 has attachment holes at locations corresponding to the attachment holes of the cover component 36. Screws are inserted through the attachment holes of the cover component 36 from the inside of the cabin, and those screws are fastened into the attachment holes of the door inner panel 20. The door service hole cover 16 is fixed to the door inner panel 20 in this manner.

The shock absorption component 38 is placed at, for example, a position of the door service hole cover 16 generally corresponding to the waist of a vehicle occupant who sits on a vehicle seat.

Figure 3:
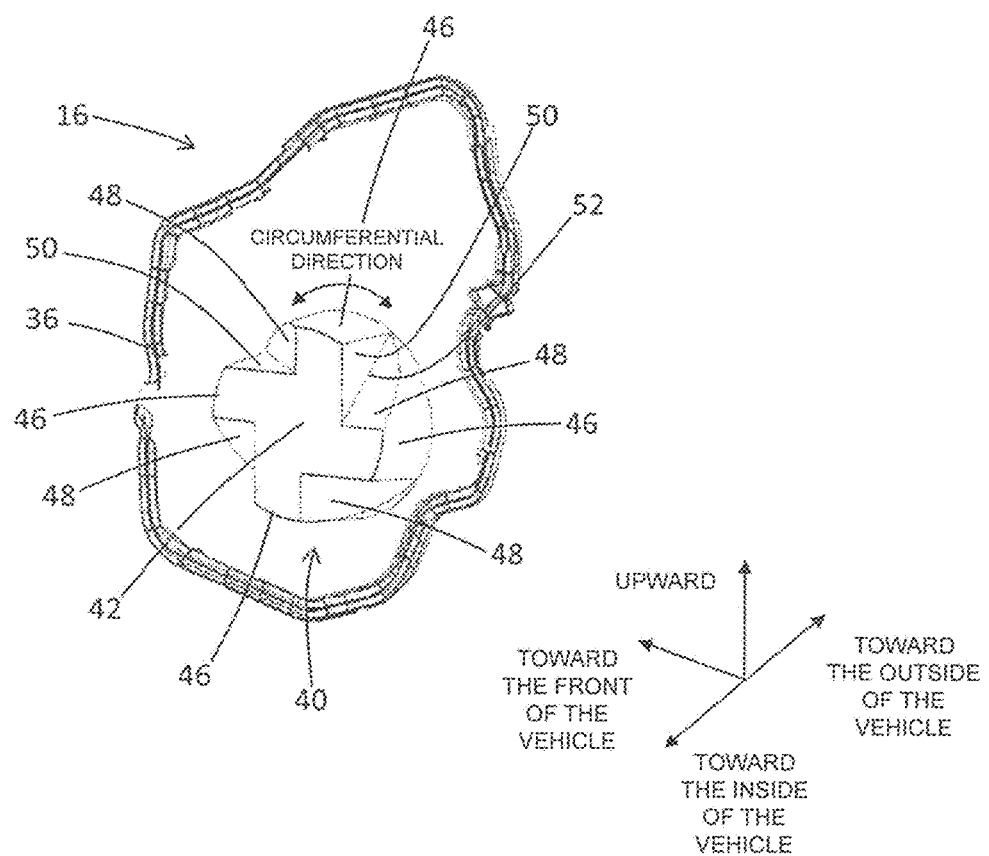
FIG. 3 is a perspective view of a door service hole cover according to an embodiment of the present disclosure.

The shock absorption component 38 will be described in detail below with reference to FIG. 3. FIG. 3 is a perspective view of the door service hole cover 16 according to an embodiment of the present disclosure.

The cabin inner component 40 is configured to inwardly crush and deform while being twisted upon application of a force acting in the direction of projection of the cabin inner component 40 (acting from the inside toward the outside of the cabin). For example, the side surface of the cabin inner component 40 has a plurality of ridge lines (lines corresponding to boundaries between surfaces) that are oblique to the direction of projection, and, upon application of a force acting in the direction of projection, the cabin inner component 40 is folded inwardly along the plurality of ridge lines formed on its side surface and inwardly crushes while being twisted. More specifically, as a plurality of fold lines (valley lines) are formed on the side surface of the cabin inner component 40 as the plurality of ridge lines, the cabin inner component 40 is folded inwardly along the plurality of fold lines and crushes inwardly while being twisted. The cabin inner component 40 may be configured using, for example, origami-based engineering ("origami" is the art of paper folding). Specifically, a cylindrical origami structure using a reversed spiral model may be used as the cabin inner component 40.

A structure of the cabin inner component 40 will be described in detail below. The cabin inner component 40 has a plurality of walls 46 that are placed in series in the circumferential direction of the cabin inner component 40. In the illustrated embodiment, the cabin inner component 40 has four walls 46 that are spaced apart by 90°. Each of the walls 46 has a slope surface 48 that is oblique to the direction of projection of the cabin inner component 40 (the direction from the outside toward the inside of the cabin) and a side surface 50 that is opposite the slope surface 48 and in parallel with the direction of projection. More specifically, the slope surface 48 is oblique to both of the circumferential direction of the cabin inner component 40 and the direction of projection of the cabin inner component 40 and faces in a direction that is halfway between the circumferential direction and the direction of projection. The side surface 50 is perpendicular to the circumferential direction and faces in the circumferential direction. The slope surface 48 is inclined from the surface 42 to a joint where the cover component 36 and the cabin inner component 40 meet, toward a direction in which the distance from the side surface 50 on the opposite side increases. In other words, the slope surface 48 is inclined from the surface 42 to the above-described joint toward the outside of the wall 46. As such, the wall 46 has a shape that widens from the surface 42 to the above-described joint toward the circumferential direction on the side of the slope surface 48. Further, the widths of the slope surface 48 and the side surface 50 gradually narrow from the surface 42 to the above-described joint. At a position adjacent to (90° apart from) the wall 46 in the circumferential direction, a second wall 46 whose orientation is rotated by 90° from the first wall 46 is placed. A groove is formed between the first and second walls 46 that are adjacent to each other, the slope surface 48 of the first wall 46 and the side surface 50 of the second wall 46 constitute surfaces of the groove. The groove is formed on the side surface of the cabin inner component 40 from the surface 42 to the joint where the cover component 36 and the cabin inner component 40 meet, so as to be oblique to the direction of projection. Grooves formed on mutually facing side surfaces are formed toward mutually opposite directions. Each of the grooves has a V-shaped cross section defined by the slope surface 48 and the side surface 50, in which a portion 52 corresponding to the vertex of the V shape corresponds to a ridge line, or, in other words, a fold line (or a valley line) as described above. Specifically, the width and the depth of the groove gradually decrease from the surface 42 to the joint where the cover component 36 and the cabin inner component 40 meet. The shape and the number of the walls 46 are given merely by way of example.

Figure 4:
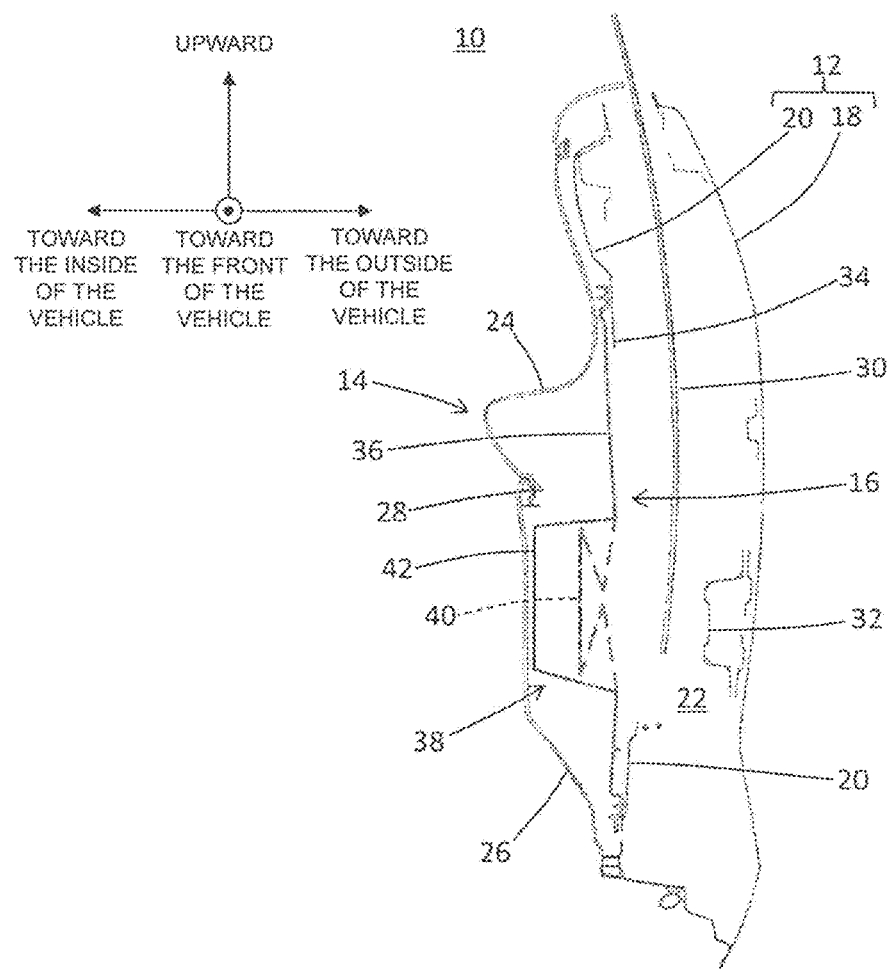
FIG. 4 is a cross-sectional view of a door for a vehicle according to an embodiment of the present disclosure.
Figure 5:
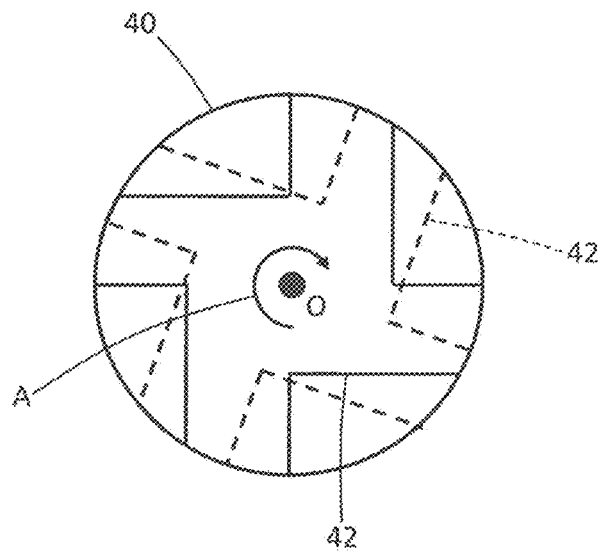
FIG. 5 illustrates a shock absorption component according to an embodiment of the present disclosure as viewed from the inside of the cabin.

Action of the shock absorption component 38 according to an embodiment of the present disclosure will be described below with reference to FIGS. 3 to 5. FIG. 4 is a cross-sectional view of the vehicle door 10 according to an embodiment of the present disclosure. FIG. 5 illustrates the shock absorption component 38 according to an embodiment of the present disclosure as viewed from the inside of the cabin.

A side collision of the vehicle deforms the door panel 12 toward the inside of the cabin, and the shock absorption component 38 is pressed from the outside of the cabin toward the inside of the cabin. As such, the surface 42 of the cabin inner component 40 hits against the door trim 14 and receives a force from the inside of the cabin, so that the cabin inner component 40 crushes and absorbs the impact of the side collision. As the cabin inner component 40 projects toward the inside of the cabin, the cabin inner component 40 easily hits against the door trim 14 and therefore crushes at a point in time earlier than in the case of a structure in which the shock absorption component 38 does not project toward the inside of the cabin. Upon application of a force acting in the direction of projection of the cabin inner component 40, while the slope surface 48 serves as a brace against that force and retards deformation of the wall 46, the wall 46 inwardly crushes as the wall 46 collapses sideways toward the side surface 50 (toward the slope surface 48 of the adjacent wall 46). In other words, as the slope surface 48 is oblique from the surface 42 to the joint where the cover component 36 and the cabin inner component 40 meet, toward a direction in which the distance from the side surface 50 on the opposite side increases (inclined toward the outside of the wall 46), even if a force acting in the direction of projection is applied to the wall 46, the slope surface 48 serves as a brace against that force. Therefore, the wall 46 does not collapse sideways toward the slope surface 48. On the other hand, as the side surface 50 is in parallel with the direction of projection, the side surface 50 does not serve as a brace, and the wall 46 collapses sideways toward the side surface 50. As described above, the side surface 50 serves as a fragile portion and allows the wall 46 to collapse sideways. As this phenomenon occurs in every wall 46 to cause every wall 46 to collapse, the entire cabin inner component 40 inwardly crushes while being twisted. Although, in the above-described example, the side surface 50 is in parallel with the direction of projection, the side surface 50 may be inclined from the surface 42 to the above-described joint toward the slope surface 48. In other words, the side surface 50 may be inclined toward the inside of the wall 46. In this case as well, because the side surface 50 does not serve as a brace, the wall 46 does not collapse sideways toward the slope surface 48, but collapses sideways toward the side surface 50.

In FIG. 4, broken lines schematically illustrate the cabin inner component 40 that has crushed inwardly. As the cabin inner component 40 crushes, air in the space 44 formed in the cabin inner component 40 is compressed. As the space 44 is in communication with the space 22 formed in the vehicle door 10, the compression of air in the space 44, in turn, increases the pressure in the space 22. The pressure sensor detects the change in pressure. Although not illustrated in FIG. 4, the cabin inner component 40 crushes with the surface 42 being in contact with the door trim 14.

FIG. 5 schematically illustrates a manner in which the surface 42 moves when the cabin inner component 40 crushes. The surface 42 of the cabin inner component 40 rotates in the circumferential direction toward which the walls 46 collapse (the direction of rotation A) about the central axis O of the cabin inner component 40 that extends in the direction of projection. In other words, the cabin inner component 40 crushes while the surface 42 rotates. In FIG. 5, solid lines illustrate the surface 42 that has not yet rotated, and broken lines illustrate the surface 42 that has rotated.

As described above, according to an embodiment of the present disclosure, the door service hole cover 16 including the cabin inner component 40 that projects toward the inside of the cabin and that is open toward the outside of the cabin is used. As such, upon a side collision, the pressure in the vehicle door 10 can be increased at an earlier point in time, and therefore, the side collision can be detected quickly.

Further, as the cabin inner component 40 crushes inwardly, the cabin inner component 40 can be deformed without the shock absorption component 38 interfering with the joint 28 or other surrounding components. Therefore, it is unnecessary to provide additional space around the shock absorption component 38 to allow for deformation of the shock absorption component 38.

Further, as the door service hole cover 16 can be manufactured by a typical technique such as injection molding, the door service hole cover 16 can be manufactured at low cost without requiring a special component such as a slide die.

Although, according to an embodiment of the present disclosure, a component that crushes inwardly and deforms while being twisted is used as the shock absorption component, other structures are also possible for example, a component having an accordion-folded shape may be used as the shock absorption component.

The invention claimed is:

1. A door service hole cover comprising:
   a cover component that is configured to cover a service hole formed in a door for a vehicle; and
   a shock absorption component that is integral to the cover component, the shock absorption component comprising:
   a cabin inner component, at least a portion of which projects from the cover component toward the inside of a cabin and which is hollow and open toward the outside of the vehicle; and
   a fragile portion formed on a side surface of the cabin inner component and configured to allow the cabin inner component to crush and deform in a circumferential direction upon application of a force acting in a direction of projection of the cabin inner component.

2. The door service hole cover according to claim 1, wherein
   the cabin inner component includes a wall, a slope surface, and the side surface,
   the slope surface is oblique to the direction of projection and the side surface is opposite the slope surface and in parallel with the direction of projection, and
   upon application of a force acting in the direction of projection, while the slope surface serves as a brace and retards deformation of the wall, the wall inwardly crushes and deforms as the wall collapses sideways toward the side surface.

3. The door service hole cover according to claim 1, wherein
   the cabin inner component includes a plurality of walls, a plurality of slope surfaces, and a plurality of side surfaces, and
   upon application of a force acting in the direction of projection, while each slope surface serves as a brace and retards deformation of each wall, each wall inwardly crushes and deforms as each wall collapses sideways toward each adjacent side surface such that the cabin inner component crushes and deforms in the circumferential direction.

4. The door service hole cover according to claim 2, wherein
the side surface of the cabin inner component includes a fold line at a boundary between the side surface and the slope surface, the fold line extends obliquely to the direction of projection.

5. The door service hole cover according to claim 3, wherein
the cabin inner component includes a surface, the plurality of walls extend from the surface, and
the surface rotates about an axis that extends in the direction of projection when the cabin inner component crushes and deforms in the circumferential direction.

\* \* \* \* \*